Aug. 17, 1943.  R. J. GRAY  2,326,851
DISPENSING DEVICE
Filed Jan. 21, 1941  6 Sheets-Sheet 1

Fig. 1.

INVENTOR.
Russell J. Gray
BY
Leonard L. Kalish

Aug. 17, 1943. R. J. GRAY 2,326,851
DISPENSING DEVICE
Filed Jan. 21, 1941 6 Sheets-Sheet 3

INVENTOR.
Russell J. Gray
BY
Leonard L. Kalish

Aug. 17, 1943.     R. J. GRAY     2,326,851
DISPENSING DEVICE
Filed Jan. 21, 1941     6 Sheets-Sheet 6

INVENTOR.
Russell J. Gray
BY Leonard L. Kalish

Patented Aug. 17, 1943

2,326,851

UNITED STATES PATENT OFFICE 2,326,851

DISPENSING DEVICE

Russell J. Gray, Meadville, Minn.

Application January 21, 1941, Serial No. 375,134

10 Claims. (Cl. 221—74)

The present invention relates to certain new and useful fluid delivery devices and more particularly to a certain new and useful lubricant dispensing device.

One object of the present invention is to provide a simple, inexpensive and dependable device for delivering lubricant or the like from a container.

Another object of the present invention is to provide means for measuring and dispensing a predetermined quantity of lubricating grease or the like.

Other objects and purposes of the present invention are apparent in the following specification and claims and in the accompanying drawings.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangement and organization of the instrumentalities as herein shown and described.

Referring to the accompanying drawings in which like reference characters indicate like parts throughout.

In one embodiment of the present invention, shown in Figures 1 to 7 inclusive, I provide a generally cylindrical body portion 20 which is open at both ends.

Fitted within the lower end of said body portion 20 is the base member 21 which is generally cylindrical in cross section and which is more or less permanently affixed to the lower end of said body portion in a generally fluid-tight sealing relationship by any method well known in the art—such as for example, screw-threading, sweating, spot welding, soldering etc.

The base member 21 contains one or more openings 22 which are preferably placed off-center. The base member 21 also contains the central opening 23.

A valve member 24 is fitted within the base member 21. Said valve member 24 includes a cylindrical shaft 25 which is fitted within the central opening 23 and is disposed to slide within said opening 23 in a generally fluid-tight relationship therewith.

Fitted about the upper and inner end of the shaft 25 is the disc-like valve face 26. Fitted about the lower and outer end of the shaft 25 is the shoulder 27.

Thus the valve 24 is adapted to reciprocate within the central opening 23, its travel in the upper direction being limited by the shoulder 27 making contact with the center portion of under surface of the base member 21 while its travel in the lower direction is limited by the face 26 making contact with the upper surface of the base member 21.

Figure 1:
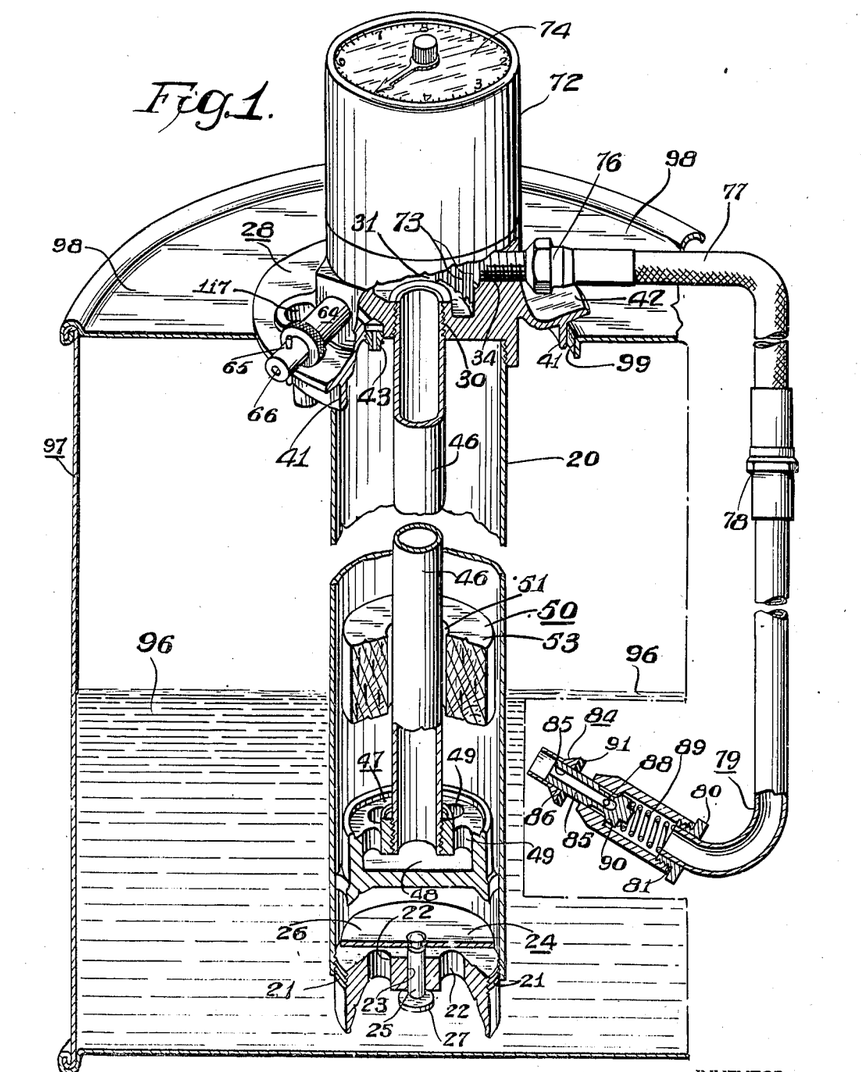
Figure 1 represents a more or less schematic view partly in section and partly in elevation of one embodiment of the present invention as it appears when installed in a lubricant container—parts being broken away better to reveal the inner construction thereof.
Figure 2:
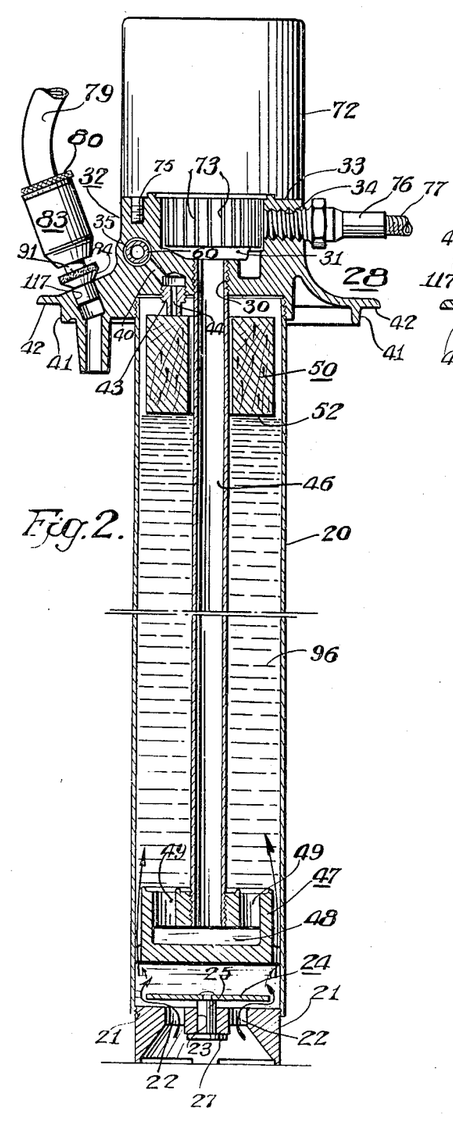
Figure 2 represents a vertical cross-sectional view of the embodiment shown in Figure 1, as it appears at the end of its intake cycle—that is when it has been filled with lubricant and just prior to the beginning of its discharge or delivery cycle.
Figure 3:
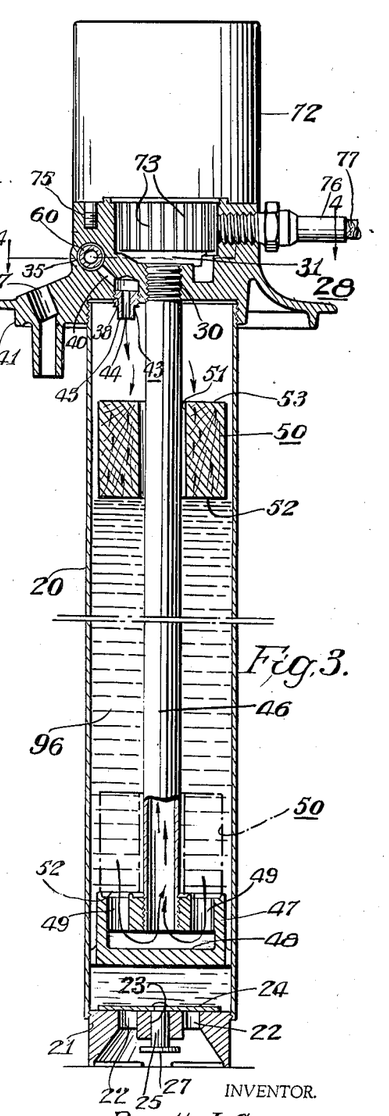
Figure 3 represents a vertical cross-sectional view similar to that of Figure 2 but showing the positions of the parts during the discharge or delivery cycle—the position of the float 50 at the end of the discharge or delivery cycle being indicated in dotted lines.
Figure 4:
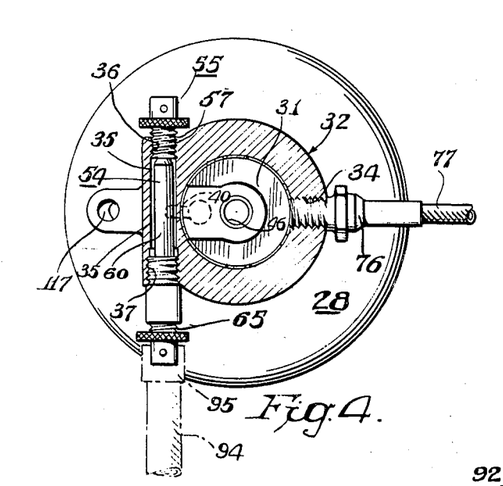
Figure 4 represents a horizontal cross-sectional view generally along the line 4—4 of Figure 2.

When said valve 24 is in its lowermost position, the face 26 thereof seals the opening 23 in the base member 21 as shown in Figure 3. When the valve 24 is in its upper position, the openings 23 are unsealed as shown in Figures 1 and 2.

Fitted about the upper end of the body portion 20, is the head member 28. Said head member 28 is preferably integrally formed as for example die casting in one piece and is fitted in a generally fluid-tight sealing relationship about the upper end of said body portion 20—for example, by means of the screw-thread arrangement shown in Figures 1, 2 and 3.

The head 28 includes the downwardly projecting socket member 29 which is internally threaded to engage with the externally threaded upper end of the body portion 20 and a smaller, internally threaded opening 30 which extends from the opening in the socket member 29 upwardly to communicate with a metering chamber 31. The head 20 has an upwardly-extending, annular seating member 32 having a generally horizontal, upper seating surface 33 upon which a flow meter may be disposed as will be hereinafter described. An internally threaded grease outlet opening 34 passes through the seating member 32 and communicates with the metering chamber 31.

A generally cylindrical port 35 passes through the upper portion of the head 28 in a generally horizontal plane transfixing said annular seating member 32 at the portion thereof diametrically opposite the grease outlet port 34. Said port 35 is internally threaded at one end 36 and is slightly enlarged and internally threaded at the other end 37.

An internally threaded opening 38 extends upwardly from the socket member 29, said opening 38 being more or less adjacent to the opening 30 but terminating short of the metering chamber 31. A communicating port 40 connects the vertical opening 38 with the horizontal port 35.

The outer periphery of the head 28 may be circular and may be provided with the downwardly-extending, annular flange or extension 41 formed an appropriate distance from the outer periphery of the head 28—as for example ⅜ of an inch more or less. As will be hereinafter described, the head 28 is designed to be placed upon an opening in the upper face of a drum or similar container of lubricant—the annular extension 41 fitting within the opening and serving to center the head 28 therein while the outer portion 42 of the head 28 serves as a support therefor.

An opening 117 may be provided in the head 28 inwardly from the extension 41 to serve as a support and drain opening for a delivery nozzle as will be hereinafter described.

A valve seat 43 which has the central opening 44 is threadedly adapted to be screwed into the opening 38 thereby forming a generally plane, horizontal, lower seating surface 45 extending within the body portion 20.

Extending downwardly within the body portion 20 is the centrally located pipe 46 which is externally threaded at its upper end and screwed into the central opening 30 in the head 28. Said pipe 46 extends downwardly to within a short distance of the base member 21 and is externally threaded at its lower end to receive an intake valve 47. Said intake valve 47 is generally circular in cross section—its maximum diameter being somewhat less than the inside diameter of the body portion 20 so that there is a clearance between said valve 47 and said body portion 20.

The valve 47 contains a central opening 48 which communicates with the opening in the pipe 46 and also contains one or more upwardly-extending ports 49 which communicate with the central opening 48 and extend to the upper surface of the intake valve 47.

A generally cylindrical float member 50 having a central axial aperture 51 is fitted about the pipe 46—said opening 51 being sufficiently larger than the pipe 46 to permit such float 50 to move slidably upon said pipe 46 in a generally vertical plane. The outside diameter of said float 50 is somewhat less than the inside diameter of the body portion 20 so that a small clearance is maintained between them.

Said float member 50 is so disposed that when it is in its lowermost position as shown in the dotted lines in Figure 3, its under surface 52 contacts the intake valve 47 and seals the openings 49 therein; while when said float is in its uppermost position its upper surface 53 contacts the lower face 45 of the valve seat 43, thereby sealing the opening 44 in said valve seat 43 as shown in Figure 2.

Said float 50 may be of any appropriate buoyant construction. Thus the float 50 may be made simply out of a block of wood, which is inexpensive and easily workable. It is also possible, however, to construct the float 50 from a synthetic resin composition or a hard rubber composition or in the form of a hollow metal shell.

Figure 5:
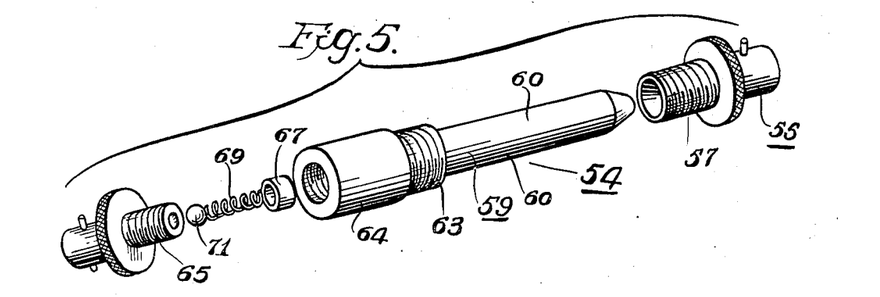
Figure 5 represents a perspective view of the Venturi pump 54 (shown in Figure 1) constituting part of the present invention as it appears when disassembled.
Figure 6:
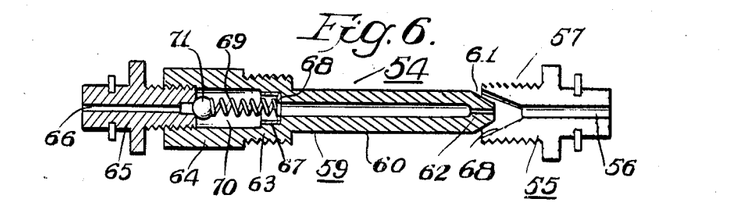
Figure 6 represents a cross-sectional view of the venturi shown in Figure 5 as it appears when assembled.

Within the port 35 in the head 28 is disposed a Venturi pump which is designated generally by the numeral 54 and which is shown on an enlarged scale in Figures 5 and 6.

Said Venturi pump 54 includes a pin fitting 55 having the axial opening 56. The inner end of the pin fitting 55 is externally threaded as at 57 whereby it may be fastened within the threaded end 36 of the port 35.

The inner end of the pin fitting 55 is inwardly tapered to provide the generally frusto-conical opening 58 therein.

A Venturi valve body 59 is disposed within the port 35. Said valve body 59 is axially apertured and includes the smaller, cylindrical portion 60 which is outwardly tapered at one end thereof to provide the frusto-conical head 61 having the needle opening 62.

Said head 61 is in close proximity to the frusto-conical opening 58 in the fitting 55 and has a somewhat greater angle of taper than has the opening 58. A slight clearance is provided between the outer edge of the opening 58 and the adjacent portion of the head 61.

At the other end of the cylindrical portion 60 is provided an enlarged cylindrical portion 63 which is externally threaded to engage in the threaded portion 37 of the port 35.

The outer end of the Venturi valve body 59 consists of the still further enlarged cylindrical portion 64 which is internally threaded at its outer end to receive an externally threaded pin fitting 65 having the axial opening 66.

A ball check serves to permit the passage of air through the pin fitting 65 in the inward direction only. This ball check consists of the ball stop 67 disposed within the opening 68 in the portion 63 of the Venturi valve body 59, the coil spring 69 within the enlarged opening 70 of the portions 63 and 64 and the check ball 71 which is urged outwardly by the spring 69 into a sealing relationship with the inner end of the opening 66 in the pin fitting 65.

A flow meter 72 may be fitted upon the upper face 33 of the seating member 32 of the head 28. This flow meter 72 may be of any conventional construction, as for example that shown in Figure 1 having the metering vanes 73 projecting within the metering chamber 31 of the head 28.

In Figures 1, 2 and 3 the flow meter 72 is shown as being disposed with its indicating face 74 facing upwardly to permit the convenient reading of the same. It is understood, however, that said flow meter 72 may be arranged in other positions and that the present invention is in no way limited to the particular arrangement herein shown.

Said flow meter 72 may be held in place upon the face 33 of the seating member 32 by one or more threaded bolts which may be screwed into one or more internally threaded, downwardly-extending sockets 75 provided in the seating member 32 of the head 28.

While any conventional type of hose and nozzle assembly may be used with the pump hereinabove described, I prefer to use the delivery hose and nozzle shown in Figures 1 and 7.

Thus, an externally threaded coupling 76 may be screwed into the grease outlet opening 34. The coupling 76 connects with an appropriate length (for example six feet) of low pressure hose 77. The other end of the hose 77 is connected by means of another coupling 78 to a nozzle which is designated generally by the numeral 79.

The nozzle 79 includes the nozzle tube 80 which is bent at its outer end and is connected, at its outermost end, by means of a bushing 80 and a copper gasket 81 to a delivery valve 82.

The delivery valve 82 includes the generally cylindrical valve body 83 and a valve tip 84 which is slidably mounted within the outer end of the body 83.

The valve tip 84 contains a tubular portion 85 which carries at its outermost end a generally funnel-shaped member 86 which is adapted to be inserted into the opening of a gear housing of an automobile as will be hereinafter described. The innermost end of the tubular portion 85 is flared and sealed as at 87 and a small opening 88 passes through the side wall of the member 85 at a point adjacent to the inner end 87 thereof.

A spring 89 which is disposed within the valve body 83 is seated against the inner end 87 of the tubular portion 85 of the valve tip 84 and urges said valve tip 84 to its outermost position.

When the valve tip 84 is in its normal outermost position, as shown in Figure 1, the opening 88 is closed off from the interior of the valve body 83 due to the fact that the inner, flared end 87 of the valve tip 84 is kept in a sealing relationship (by the spring 89) with an annular shoulder 90 which is formed in the valve body 83 and which serves as a rest for the flared end 87 and as a stop for the valve tip 84.

A gasket 91 of leather or the like may be placed about the tubular portion 85 of the valve tip 84 directly behind the funnel-shaped member 86.

Figure 7:
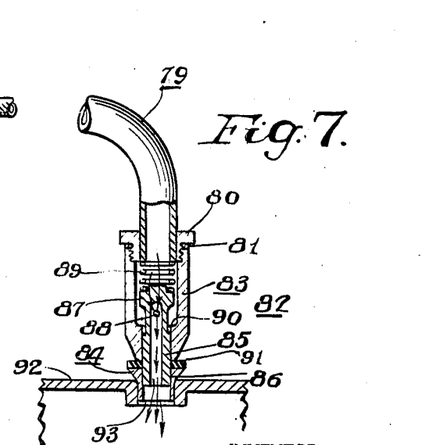
Figure 7 represents a cross-sectional view of the delivery nozzle 79 constituting part of the present invention as it appears when inserted within a gear housing to permit the delivery of grease into said housing.

When the operator desires to fill a gear housing 92 he inserts the funnel-shaped member 86 into the opening 93 in said housing 92, as shown in Figure 7, pressing the nozzle firmly against the housing and making a relatively fluid-tight seal between said housing 92 and said member 86.

This pressure forces the valve tip 84 inwardly into the valve body 83 against the tension of the spring 89; the gasket 91 making a fluid-tight seal between the funnel-shaped member 86 and the valve body 83. In this position the inner flared end 87 of the tubular portion 85 no longer makes contact with the annular shoulder 90 in said body 83 so that the opening 88 in the tubular portion 85 now communicates with the interior of the body 83 forming a continuous passage from the lubricant pump to the gear housing and permitting the filling of said housing 92 with the desired grade of lubricant. After the desired amount of lubricant has been added, the operator merely withdraws the nozzle from the gear housing 92 whereupon the spring 89 forces the valve tip 84 outwardly thus again sealing the opening 88 and preventing loss of lubricant. An opening 117 may be provided in the head 28 in which the member 86 may be inserted as shown in Figure 2, so that any drippage will drain into the container 97 of lubricant, preventing loss of lubricant and dirtying of floors.

The operation of the device constituting one embodiment of the present invention will now be described.

The lubricant pump is first inserted into a container 97 of lubricant 96 (for example a one hundred pound drum of lubricant) through an opening 99 in the top face 98 of said drum. As can be seen particularly in Figure 1, the annular extension or flange 41 of the head 28 fits within the opening 99 and centers the pump therein—the pump being supported by the peripheral edge 42 of the head 28. Thus, the body portion 20 is submerged within the level of lubricant—the base member 21 being at or near the bottom of said drum 96 whereby all or practically all of the lubricant in said drum may be utilized by means of the pump.

A compressed-air line 94 is attached by means of the coupler 95 to the pin fitting 65. The pressure of the air will unseat the ball 71 against the pressure of the spring 69 thereby permitting the flow of air under pressure through the opening 66, through the valve body 59 and out the needle opening 62. Due to the small cross-section of the opening 62 the air will emerge from the tip thereof at extremely high velocity—the air entering the pin fitting 65 at the frusto-conical end thereof and emerging finally from the outer end of the pin fitting 55.

This passage of air at extremely high velocity from the needle opening 62 produces a vacuum or suction or Venturi effect—the suction being transmitted through the port 35, the connecting port 40 and the opening 44 in the valve seat 43 to the interior of the body portion 20.

The suction thereupon opens the valve member 24 in the base 21 and results in the sucking in of lubricant 96 to the interior of the body portion 20 as shown in Figure 2.

The lubricant 96 thus sucked in from the drum 97 gradually fills the interior of the body portion rising above the intake valve 47 and raising the float 50 (said float 50 resting on the upper surface of the lubricant) until the upper surface 53 of the float 50 contacts the lower surface 45 of the valve seat 43 thereby closing the opening 44 in said valve seat 43, as shown in Figure 2 and thus cutting off the suction into the body portion 20.

When this occurs, the operator (who can note the difference in the sound of the venturi when the opening 44 is closed) thereupon disconnects the compressed-air line 94 from the pin fitting 65.

Thus, it can be seen that the connection of an air line to the pin fitting 65 has resulted in a filling of the body portion 20 of the pump with lubricant drawn from the outer lubricant container 97.

The compressed-air line 94 is now attached by means of the coupler 95 to the pin fitting 55. The pressure thus introduced is communicated through the port 35 and the connecting port 40 (the pin fitting 65 being closed against internal pressure by the check ball 71) to the opening 44 in the valve seat 43 thereby forcing the float 50 downward to uncover the opening 44 so that the pressure is communicated to the surface of the lubricant 96 within the body portion 20.

Under this pressure, the lower valve member 24 in the base 21 is closed and the lubricant 96 is forced through the openings 49 and the opening 48 in the intake valve 47 into the interior of the pipe 46.

The lubricant is forced upwardly through the pipe 46 and the opening 30 into the metering chamber 31 and finally leaves by the lubricant outlet 34—the passage of the lubricant 96 through the metering chamber 31 actuating the metering vanes 73 of the flow meter 72 so that the flow meter records the volume of lubricant dispensed, as for example, in pints.

The lubricant passes from the outlet opening 34 into the coupling 76, the hose 77, the coupling 78 and out the nozzle 79—assuming that the valve tip 84 of the delivery valve 82 has been properly inserted into the opening 93 of a gear housing 92. Of course, when said valve tip 84 is removed from the opening 93 the delivery valve 82 is automatically shut so that the further flow of lubricant is prevented regardless of the continued pressure of the compressed-air acting through the pin fitting 55. The tip 84 may then be replaced in the opening 117 of the head 28.

As the lubricant is used up, its level within the body portion 20 drops and the float 50 drops correspondingly until its under-surface 52 finally contacts the intake valve 47 and seals the openings 49 therein as shown in the dotted lines of Figure 3.

When this occurs, of course, further flow of lubricant ceases as is indicated on the flow meter 72. Thus, the valve 50 prevents the passage of air through the pipe 46 thereby eliminating possible false readings on the flow meter 72. This has been found to be highly desirable since, if no such precaution is taken, air may become entrained within the column of lubricant in the pipe 46 so that the flow meter will give a too-high reading.

Furthermore, the pump constituting one embodiment of the present invention eliminates the possibility of pumping a lubricant-air mixture when the level of the lubricant in the outer container 97 falls too low. If this condition should arise, so that both lubricant and air are sucked in through the openings 22 in the base 21 under the suction created by the venturi, the float 50 cannot rise to shut off the valve seat 43 until and unless the body portion 20 is completely filled with lubricant. The operator upon observing that the body portion 20 is not filled within the expected time will know that the level of lubricant within the container 97 has fallen too low and will either replace or refill the drum.

Thus it can be seen that the present invention operates in a simple, accurate and dependable way to deliver a positive supply of lubricant under pressure and constitutes an inexpensive and rugged unit which is highly desirable for the extensive use to which such lubricating devices are put in modern automobile service stations.

Another embodiment of the present invention is shown in Figures 9 to 13 inclusive.

This embodiment contains a body portion 20—a, base member 21—a, and valve member 24—a, similar to 20, 21 and 24 respectively, shown in the embodiment of Figures 1 to 7 inclusive.

Figure 8:
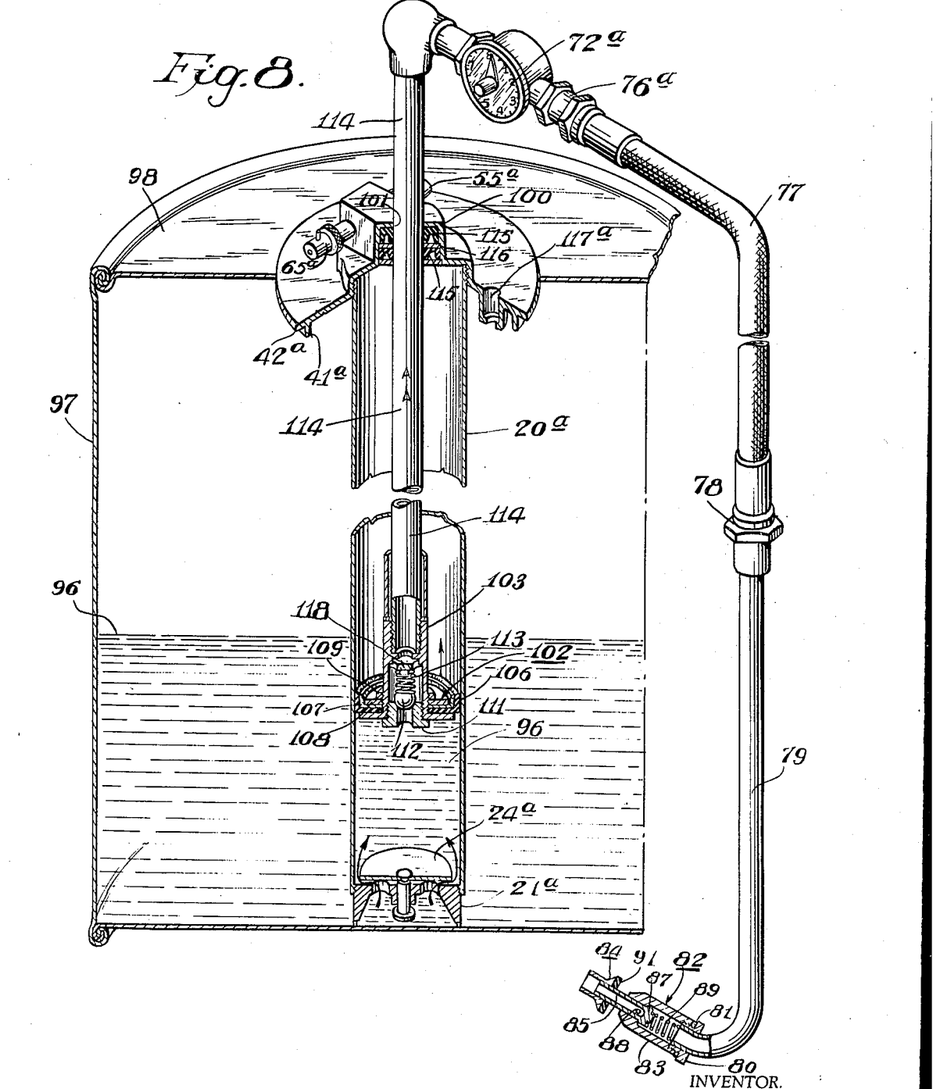
Figure 8 represents a more or less schematic view partly in section and partly in elevation of another embodiment of the present invention as it appears when installed within a lubricant container—parts being broken away better to reveal the construction thereof.
Figure 9:
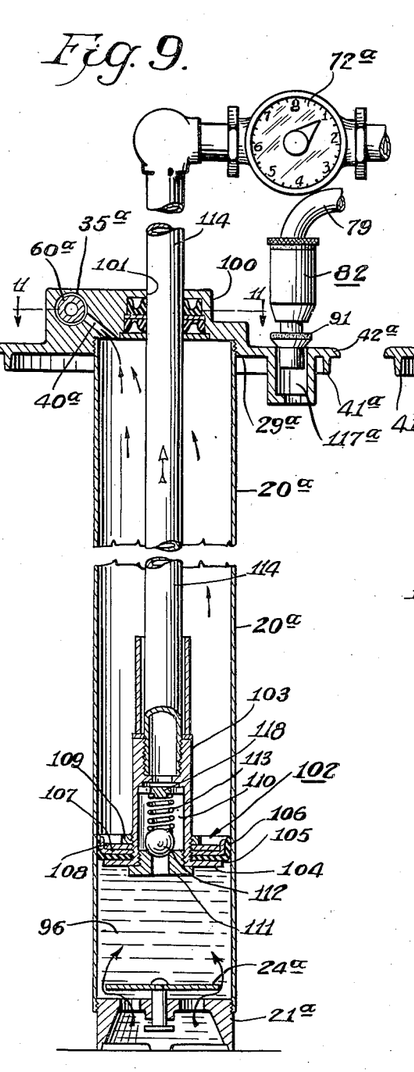
Figure 9 represents a vertical cross-sectional view of the embodiment shown in Figure 8 as it appears during the intake stroke thereof.
Figure 10:
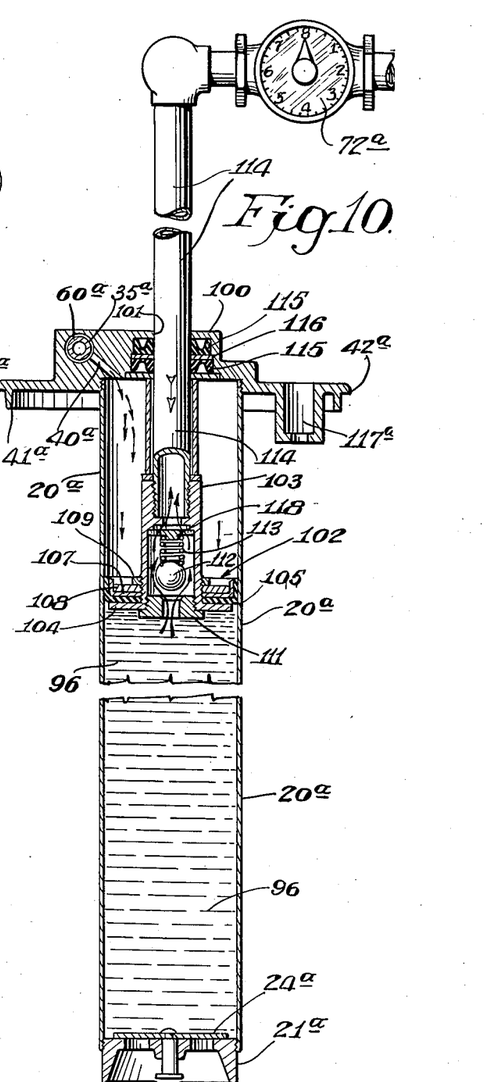
Figure 10 represents a vertical cross-sectional view similar to that of Figure 9 but showing the positions of the parts during the discharge or delivery stroke.
Figure 11:
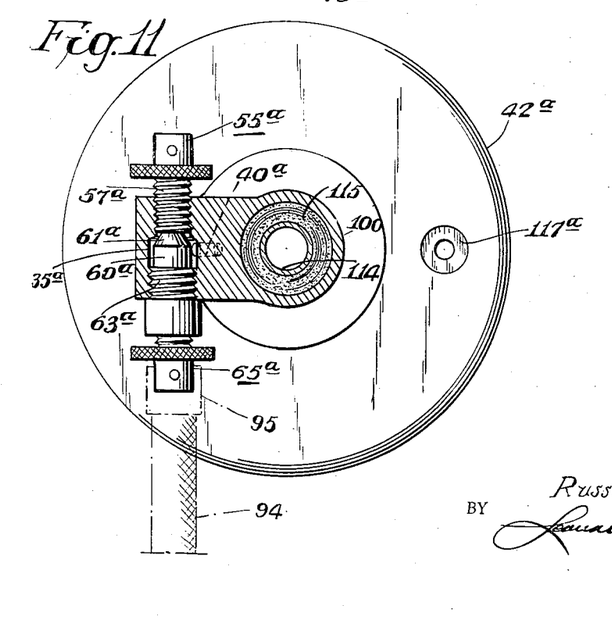
Figure 11 represents a horizontal cross-sectional view generally along the line 11—11 of Figure 9.
Figure 12:
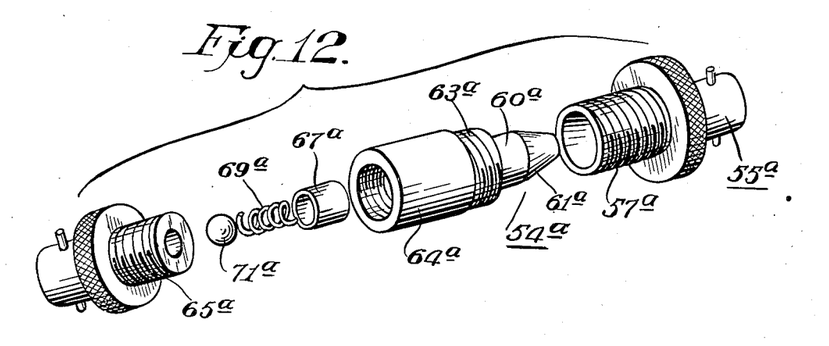
Figure 12 represents a perspective view of the Venturi pump shown in Figure 8 and constituting part of the present invention, as it appears when disassembled.
Figure 13:
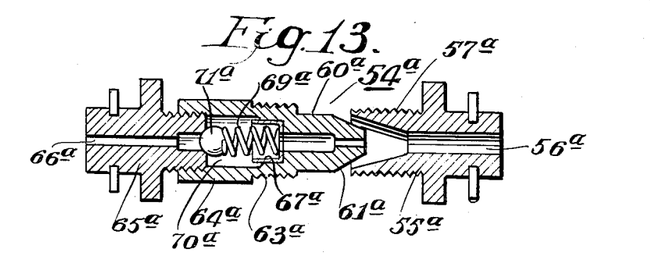
Figure 13 represents a cross-sectional view of the Venturi pump shown in Figure 12, as it appears when assembled.

The head 28—a is formed somewhat differently as shown in Figures 8, 9 and 10.

Thus the head 28—a has a socket member 29—a which is similar to socket 29 and which is adapted to be threadedly engaged to the body member 20—a.

The head 28—a also contains the port 35—a (similar to port 35 but somewhat shorter than 35) and generally the same Venturi pump structure with the exception that the valve body 59—a is somewhat shorter than the body 59—the axial dimension of the cylindrical portion 60—a being less than that of 60. A connecting port 40—a (similar to port 40) connects the port 35—a with the interior of the socket member 29—a. In this embodiment, however, the opening 38 and the valve seat 43 are eliminated.

In this embodiment also the opening 30, the metering chamber 31 and the seating member 32 are eliminated and in place thereof is formed the upwardly-extending tubular portion 100 having the opening 101 in the upper end thereof.

The head 28—a contains the annular extension or flange 41—a, the outer edge 42—a and the opening 117—a (similar to 41, 42 and 117 respectively).

Within the body portion 20—a, a piston 102 is slidably mounted. Said piston 102 includes a cylindrical portion 103 and a lowermost disc-like portion 104, said disc-like portion 104 having a slightly smaller outside diameter than the inside diameter of the body member 20—a. A central opening 110 extends through the cylindrical portion 103 and the disc-like portion 104.

An oversized circular piece of cup leather 105 having an opening corresponding to the cylindrical portion 103 is fitted about said cylindrical portion and rests upon the disc-like portion 104 whereby its outer periphery 106 is turned upwardly parallel to the sides of the body portion 20—a. The outer periphery 106 of the cup leather 105 is held firmly against the walls of the body portion 20—a by means of a washer 107 and a spreader 108—said washer and spreader being in turn held in place by a nut 109 which is threadedly engaged about the outer portion of the cylindrical part 103.

In this fashion, the piston 102 forms a fluid-tight seal with the inner wall of the body portion 20—a.

Within the lower portion of the central opening 110 is disposed a ball check valve which includes the apertured ball seat 111, which is threadedly engaged within the lowermost end of said opening 110, the check ball 112, and the coil spring 113 which urges the ball 112 downwardly against the ball seat 111 so that fluid may flow through the check valve in an upward direction only. The upper end of the coil spring 113 is seated against a spider 118 which is disposed within the opening and which provides a support for said spring 113 without closing said opening 110.

A riser pipe 114 has its lower end threadedly engaged within the upper end of said opening 110 of the cylindrical portion 103 of the piston 102 and provides a passageway communicating with the central opening 110 in said piston 102.

Said riser pipe 114 extends upwardly within the body portion 20—a and extends outwardly beyond the head 28—a through the opening 101 therein.

Two pieces of U-leather 115 and an intervening U-leather divider 116 fitted about the riser pipe 114 within the tubular portion 100 of the head 28—a provide a seal for the riser pipe 114 at that point.

A flow meter 72—a is connected to the riser pipe 114 at some appropriate point thereof above the head portion 28—a. This flow meter 72—a may be of any conventional construction.

A coupling 76—a may be connected to the other end of the flow meter and may connect the lubricant pump to any conventional form of hose and nozzle assembly, although I prefer to use the hose and nozzle assembly hereinabove described.

I shall now describe the operation of this embodiment of the present invention.

The lubricant pump is first inserted into a container 97 of lubricant 96 through the opening 99 in the top face 98 of the container 97 as previously described.

Assuming that the lubricant pump is empty, and that the piston 102 and its associated riser pipe 114 are in their lowermost positions, a compressed-air line 94 is attached by means of the coupler 95 to the pin fitting 65—a.

The passage of air through the venturi will create a suction in exactly the same way as previously described. This suction will be communicated through the port 35—a and the port 38—a to the interior of the body portion 20—a. This suction will cause the piston 102 and its associated riser pipe 114 to be drawn upwardly within the body portion 20—a and will cause the valve 24—a in the base member 21—a to open so that lubricant 96 will be sucked into the body portion 20—a from the drum 97 as shown in Figure 9.

When the piston 102 and its associated riser pipe 114 have reached the uppermost limit of travel (as can be determined by observing when the riser pipe 114 stops moving upward), that portion of the body member 20—a below the piston 102 contains lubricant.

When the operator observes that the riser pipe has stopped moving, he disconnects the compressed-air line 94 from the pin fitting 65—a and connects the compressed-air line 94 by means of the coupler 95 to the pin fitting 55—a. The pressure thus created is communicated through the port 35—a and port 38—a to the interior of the body portion 20—a above the piston 102.

The pressure drives the piston downwards, thereby closing the valve 24—a.

Since the lubricant cannot escape through the openings 22—a, the downward movement of the piston 102 will cause the lubricant to force the check ball 112 open and to move upwardly within the opening 110 and the riser pipe 114 as shown in Figure 10.

Thus it can be seen that the application of compressed-air to the pin fitting 55—a drives the piston 102 downward and forces the lubricant 96 upward within the riser pipe 102, through the flow meter 72—a and through the hose and nozzle assembly to the gear housing 92 as previously described.

When the downward movement of the riser pipe has ceased, the operator knows that the body portion 20—a has been emptied of lubricant. The flow meter 72—a, of course, measures the amount of lubricant delivered as previously described.

The body portion 20 or 20—a may be formed of sheet metal or the like.

The base member 21 may be cast or otherwise formed of metal.

The head portion 28 or 28—a may be formed in any suitable way, preferably by die-casting of appropriate metal or metal alloy. For example, the head 28 or 28—a may be a die-casting of aluminium, suitably machined and finished.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A dispensing device for lubricant or the like including a storage chamber; means for drawing lubricant into said chamber comprising a Venturi suction pump connected to said chamber and a lubricant-intake valve; means for automatically cutting off the suction pump from said chamber after a desired amount of lubricant has been drawn into said chamber; means for ejecting said lubricant comprising means for introducing air under pressure into said chamber and a delivery conduit for said lubricant leading from said chamber; and a meter for measuring the flow of lubricant through said delivery conduit.

2. A dispensing device for relatively viscous lubricant or the like including a storage chamber, a pump head for said chamber, a port within said head, a connecting passageway permitting the flow of air between said port and said chamber, a Venturi suction pump disposed within said port, air-inlet means for admitting air under pressure at one end of said port for operating said Venturi pump and thereby decreasing the air pressure within said chamber, and air-inlet means for admitting air under pressure at the other end of said port for increasing the air pressure within said chamber.

3. A dispensing device for lubricant or the like including a storage chamber, a pump head for said chamber, a port within said head, a connecting passageway permitting the flow of air between said port and said chamber, a Venturi suction pump disposed within said port, air-inlet means for admitting air under pressure at one end of said port for operating said Venturi pump and thereby decreasing the air pressure within said chamber, air-inlet means for admitting air under pressure at the other end of said port for increasing the air pressure within said chamber, valve means for automatically admitting lubricant to said chamber when said chamber is under reduced pressure, and conduit means for delivering substantially all of said lubricant from said chamber when said chamber is under increased pressure.

4. A dispensing device for lubricant or the like including a storage chamber, a pump head for said chamber, a port within said head, a connecting passageway permitting the flow of air between said port and said chamber, a Venturi suction pump disposed within said port, air-inlet means for admitting air under pressure at one end of said port for operating said Venturi pump and thereby decreasing the air pressure within said chamber, air-inlet means for admitting air under pressure at the other end of said port for increasing the air pressure within said chamber, valve means for admitting lubricant to said chamber when said chamber is under reduced pressure, conduit means for delivering said lubricant from said chamber when said chamber is under increased pressure, a meter for measuring the flow of lubricant through said conduit means, and a valved delivery nozzle operatively connected to said conduit means, said nozzle being normally biased to a closed position whereby issuance of lubricant is prevented and whereby said dispensing device is rendered inoperable to deliver lubricant, said nozzle being movable to an open operating position upon insertion into a filling opening.

5. A dispensing device for lubricant or the like including a generally cylindrical body; a lubricant-intake valve at the lower end of said body; a pump head at the upper end of said body, said pump head having a metering chamber and lubricant inlet and outlet openings leading thereto, said pump head having a port therein, said port having a passageway communicating with said body and terminating in a valve seat projecting downwardly within said body; a Venturi suction pump disposed within said port; an air-inlet at one end of said port for operating said Venturi pump; an air-inlet at the other end of said port for admitting air under pressure to said body; a flow-meter operatively disposed within said metering chamber; a pipe extending downwardly from the lubricant inlet opening in said pump head and extending within said body; an apertured intake member extending upwardly from the lower end of said pipe; a generally-cylindrical, buoyant float slidably disposed about said pipe and adapted to close said apertured intake member when said float is in its lowermost position and adapted to close said valve seat when said float is in its uppermost position.

6. A dispensing device for lubricant or the like including a generally cylindrical body; a lubricant-intake valve at the lower end of said body; a pump head at the upper end of said body, said pump head having a metering chamber and lubricant inlet and outlet openings leading thereto, said pump head having a port therein, said port having a passageway communicating with said body and terminating in a valve seat projecting downwardly within said body; a Venturi suction pump disposed within said port; an air-inlet at one end of said port for operating said Venturi pump; an air-inlet at the other end of said port for admitting air under pressure to said body; a flow-meter operatively disposed within said metering chamber; a pipe extending downwardly from the lubricant inlet opening in said pump head and extending within said body; an apertured intake member extending upwardly from the lower end of said pipe; a generally-cylindrical, buoyant float slidably disposed about said pipe and adapted to close said apertured intake member when said float is in its lowermost position and adapted to close said valve seat when said float is in its uppermost position; a delivery conduit leading from the outlet opening in said pump head; and a valved delivery nozzle connected to said delivery conduit, said nozzle being normally biased to a closed position whereby issuance of lubricant is prevented and whereby said dispensing device is rendered inoperable to deliver lubricant, said nozzle being movable to an open operating position upon insertion into a filling opening.

7. A dispensing device for lubricant or the like including a generally cylindrical body; a lubricant-intake valve at the lower end of said body; a pump head at the upper end of said body having lubricant inlet and outlet openings therein, said pump head having an air-operated suction pump therein communicating with said body, said pump head having an air-inlet therein for admitting air under pressure to said body; a pipe extending downwardly from the lubricant inlet opening in said pump head and extending within said body; an apertured intake member about the lower end of said pipe; a generally-cylindrical, buoyant float slidably disposed about said pipe and adapted to close said apertured intake member when said float is in its lowermost position and adapted to close said valve seat when said float is in its uppermost position.

8. A dispensing device for lubricant or the like including a generally cylindrical body; a lubricant-intake valve at the lower end of said body; a pump head at the upper end of said body, said pump head having a port therein, said port having a passageway communicating with said body; a Venturi suction pump disposed within said port; an air-inlet at one end of said port for operating said Venturi pump; an air-inlet at the other end of said port for admitting air under pressure to said body; a pipe passing through said pump head and adapted to move slidably therethrough, said pipe extending within said body; a piston fitted about the lower end of said pipe and making fluid-tight contact with the walls of said body; and a check valve disposed within said piston and adapted to permit the passage of fluid from beneath said piston into said pipe.

9. A dispensing device for lubricant or the like including a generally cylindrical body; a lubricant-intake valve at the lower end of said body; a pump head at the upper end of said body, said pump head having a port therein, said port having a passageway communicating with said body; a Venturi suction pump disposed within said port; an air-inlet at one end of said port for operating said Venturi pump; an air-inlet at the other end of said port for admitting air under pressure to said body; a pipe passing through said pump head and adapted to move slidably therethrough, said pipe extending within said body; a piston fitted about the lower end of said pipe and making fluid-tight contact with the walls of said body; and a check valve disposed within said piston and adapted to permit the passage of fluid from beneath said piston into said pipe; a delivery conduit connected to the upper end of said pipe; a flow meter operatively connected within said conduit; and a valved delivery nozzle connected to said delivery conduit, said nozzle including being normally biased to a closed position whereby issuance of lubricant is prevented and whereby said dispensing device is rendered inoperable to deliver lubricant, said nozzle being movable to an open operating position upon insertion into a filling opening.

10. A dispensing device for lubricant or the like including a cylindrical body; a lubricant-intake valve at the lower end of said body; a pump head at the upper end of said body, said pump head having an air-operated suction pump therein and having an air inlet therein for admitting air under pressure to said body; a riser pipe extending through said pump head and adapted to move slidably through said pump head; a piston disposed about the lower end of said riser pipe, said piston being adapted to move slidably within said body in fluid-tight sealing relationship therewith; a check valve within said piston, said check valve being adapted to remain closed when said piston is stationary or is moving upwardly and being adapted to open when said piston is moved downwardly and thereby to permit the passage of lubricant from beneath said piston and into said riser pipe; said riser pipe and piston being adapted to move upwardly when said suction pump is operated and thereby to suck lubricant into said body below said piston, and being further adapted to move downwardly when air under pressure is admitted to said body thereby forcing said lubricant from the lowermost portion of said body into said riser pipe.

RUSSELL J. GRAY.